(No Model.)

H. B. BROWN.
HUB ATTACHING DEVICE.

No. 464,849. Patented Dec. 8, 1891.

Witnesses:
Will. T. Norton
W. M. Ireland

Inventor:
Harrison B. Brown
By G. L. Browne
his Attorney.

UNITED STATES PATENT OFFICE.

HARRISON B. BROWN, OF WASHINGTON, DISTRICT OF COLUMBIA, ASSIGNOR OF ONE-HALF TO W. W. DUDLEY AND F. L. BROWNE, BOTH OF SAME PLACE.

HUB-ATTACHING DEVICE.

SPECIFICATION forming part of Letters Patent No. 464,849, dated December 8, 1891.

Application filed May 11, 1891. Serial No. 392,349. (No model.)

*To all whom it may concern:*

Be it known that I, HARRISON B. BROWN, a citizen of the United States, residing at Washington, in the District of Columbia, have invented certain new and useful Improvements in Hub-Attaching Devices; and I do hereby declare the following to be a full, clear, and exact description of the invention, such as will enable others skilled in the art to which it appertains to make and use the same.

This invention relates to certain improvements in hub-attaching devices; and it consists, broadly, of a nut having rollers placed in its face, next to the axle-box, all as hereinafter fully described, and pointed out in the claims.

The invention has for its object to relieve end-thrust, and thereby make the vehicle lighter and do away with washers and prevent the nut tightening by reason of friction between the box-washers and nut, causing "hot box," so often occurring with new vehicles, and, in fact, with old ones, where the washers are not of proper size.

Heretofore rollers have been arranged between the axle-box and securing-nut; but in all cases, so far as known, they are held by a separate case or frame and not a permanent or fixed part of the nut, consequently requiring a separate handling thereof before the wheel can be removed. I overcome these objections by so arranging the rollers in the inner face of the nut, which forms their cage, that they will be in position to bear against the axle-box and secure them in a peculiar manner, all as hereinafter fully described, and shown by the accompanying drawings, forming part of this specification, in which—

Figure 1:
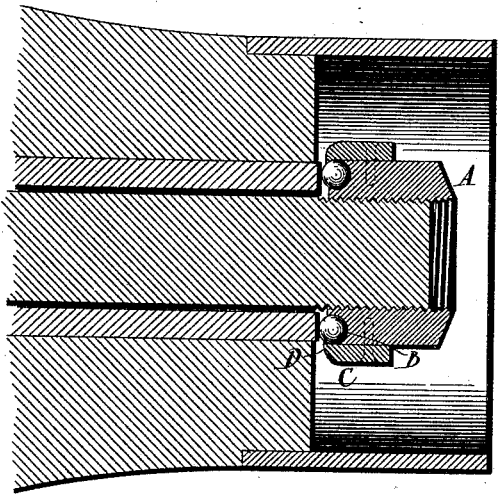
Figure 2:
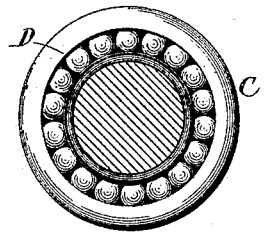
Figure 3:
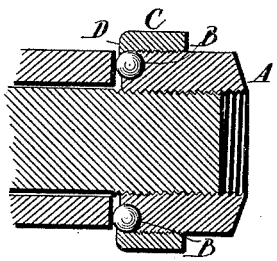

Figure 1 is a central vertical longitudinal section showing the arrangement of the nut with its rollers in contact with the axle-box. Fig. 2 is a face view of the nut, showing the rollers in place; and Fig. 3 shows the means for securing the rollers, slightly modified.

In the drawings, A denotes a nut such as commonly used for securing the wheel of a vehicle. This nut I provide with a groove B or other suitable recess adapted to support rollers slightly projecting from the face of the nut. These rollers can be confined in place in various ways without departing from the spirit of the invention; but for sake of illustration I have shown a ring C, provided with a shoulder D, which, when the ring is slid on the nut from the roller sides, securely holds the rollers in place. This ring may be shrunk on the nut, secured by a pin, as shown by dotted lines in Fig. 1 of the drawings, screw-threaded, as in Fig. 3, or in other obvious ways, to neither of which I desire to be limited.

From the foregoing it will be understood that the sole object of my invention is to provide a common axle-nut with rollers which are held and carried by the nut, and thus provide an article of manufacture that obviates a separate cage or box for the rollers, renders the use of washers unnecessary, and admits of the rollers and nut being removed at the same time, as will be fully appreciated by those having occasion to remove a wheel for regreasing and other purposes.

Having thus fully described my invention, what I claim as new, and desire to secure by Letters Patent, is—

1. A hub-attaching device consisting of a nut having means, substantially as described, for holding and supporting rollers against displacement, whether the nut is connected with or disconnected from the axle, as set forth.

2. A hub-attaching device having rollers and means for securing said rollers thereto, consisting of a recess and a confining-shoulder rigid with said attaching device, substantially as described.

3. A hub-attaching device consisting of a nut having on its inner face shoulders adapted to confine rollers arranged to bear against the axle-box, said rollers being held against dislodgment, whether the nut be connected with or disconnected from the axle, substantially as shown and described.

In testimony whereof I affix my signature in presence of two witnesses.

HARRISON B. BROWN.

Witnesses:
 WILL T. NORTON,
 ARTHUR BROWNING.